June 9, 1964 S. J. JENNINGS 3,136,003
COTTON CLEANING AND EXTRACTING APPARATUS
Filed March 23, 1961 4 Sheets-Sheet 1
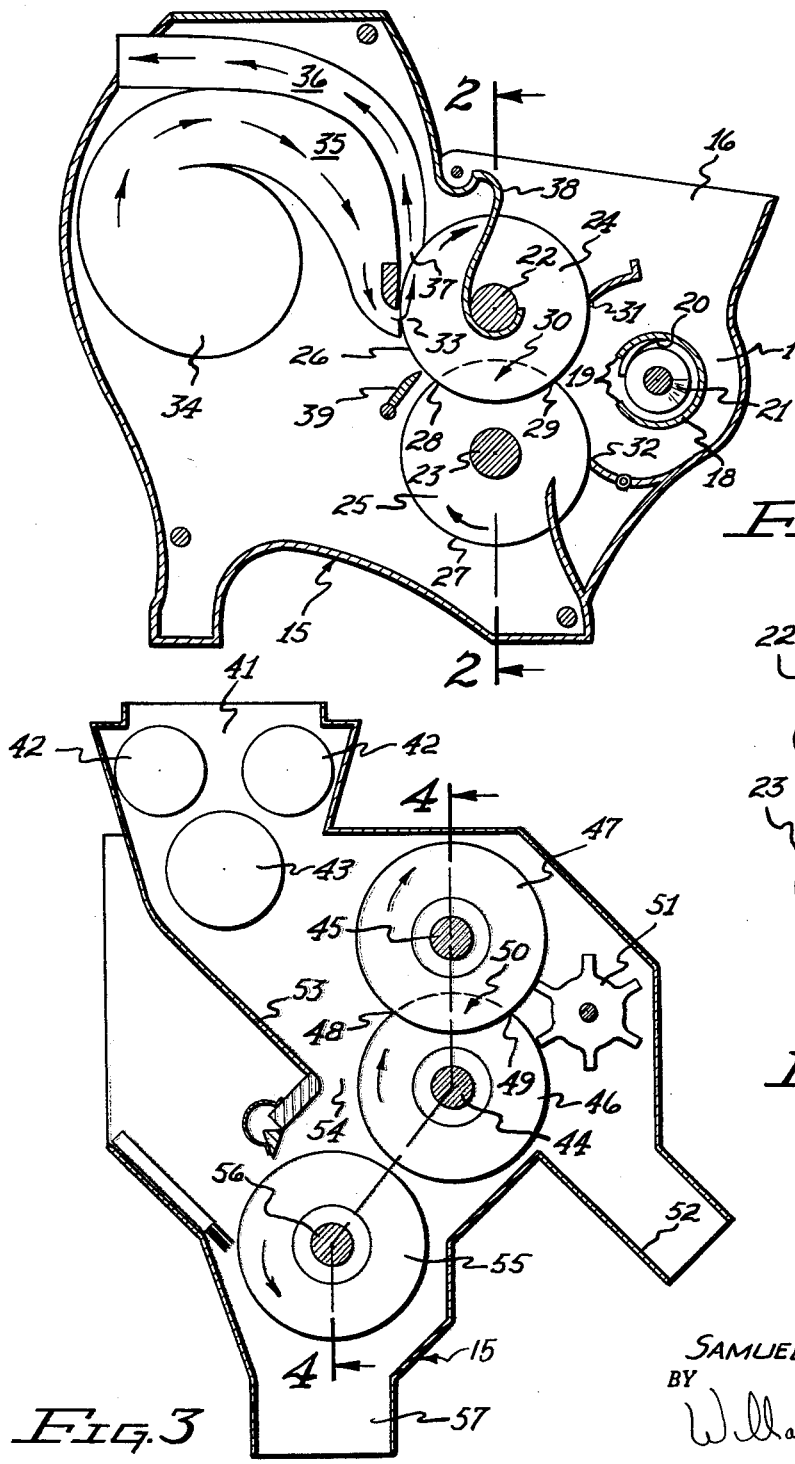
Fig. 1
Fig. 3
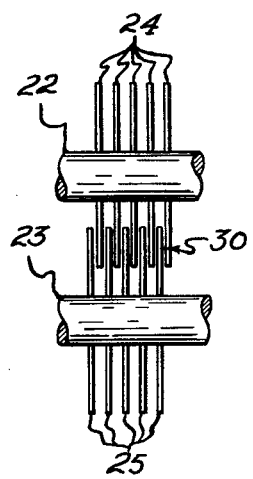
Fig. 2
INVENTOR.
SAMUEL J. JENNINGS
BY
ATTORNEY June 9, 1964    S. J. JENNINGS    3,136,003
COTTON CLEANING AND EXTRACTING APPARATUS
Filed March 23, 1961    4 Sheets-Sheet 2

INVENTOR.
SAMUEL J. JENNINGS.
BY
Willard S. Grose
ATTORNEY.

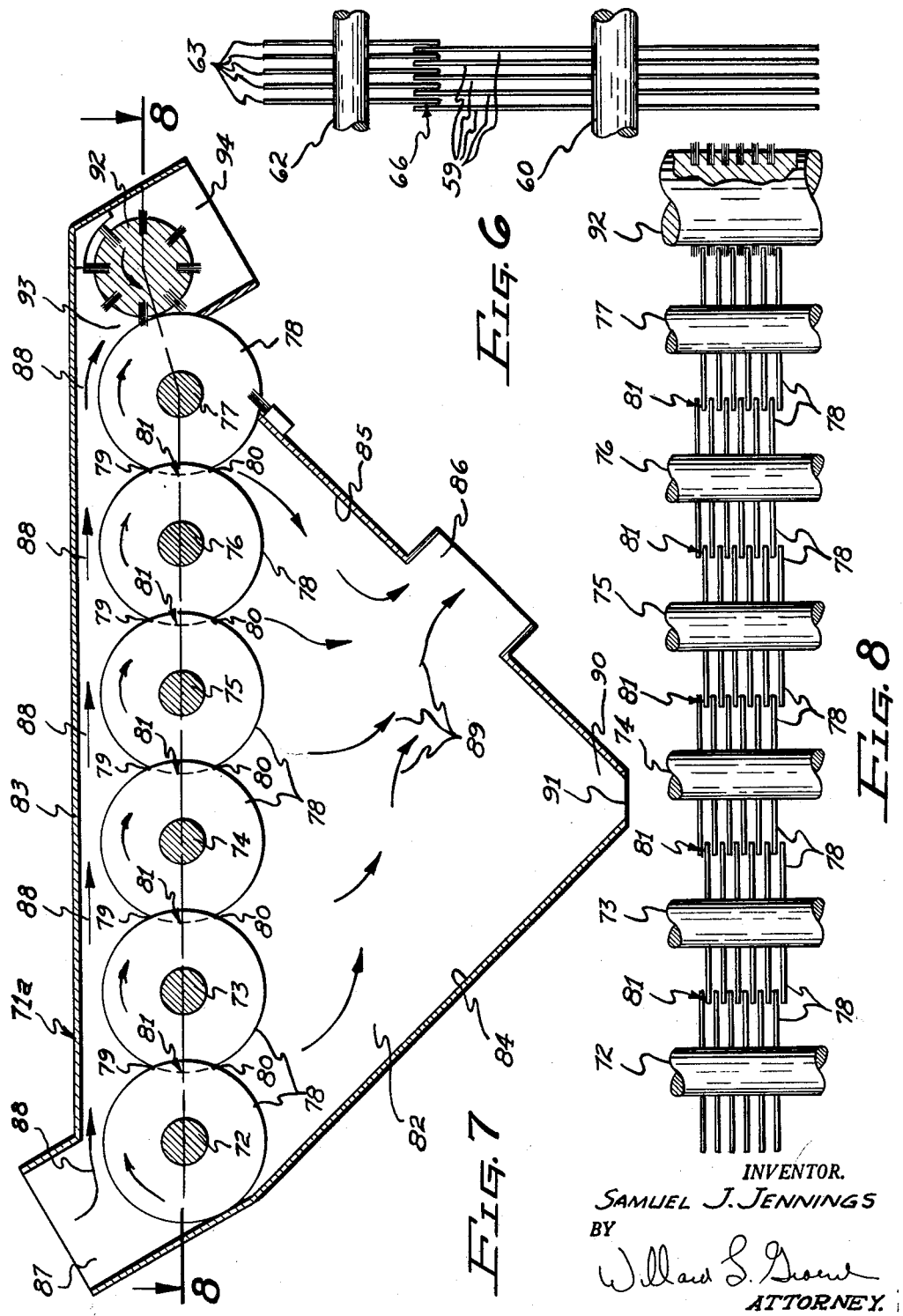

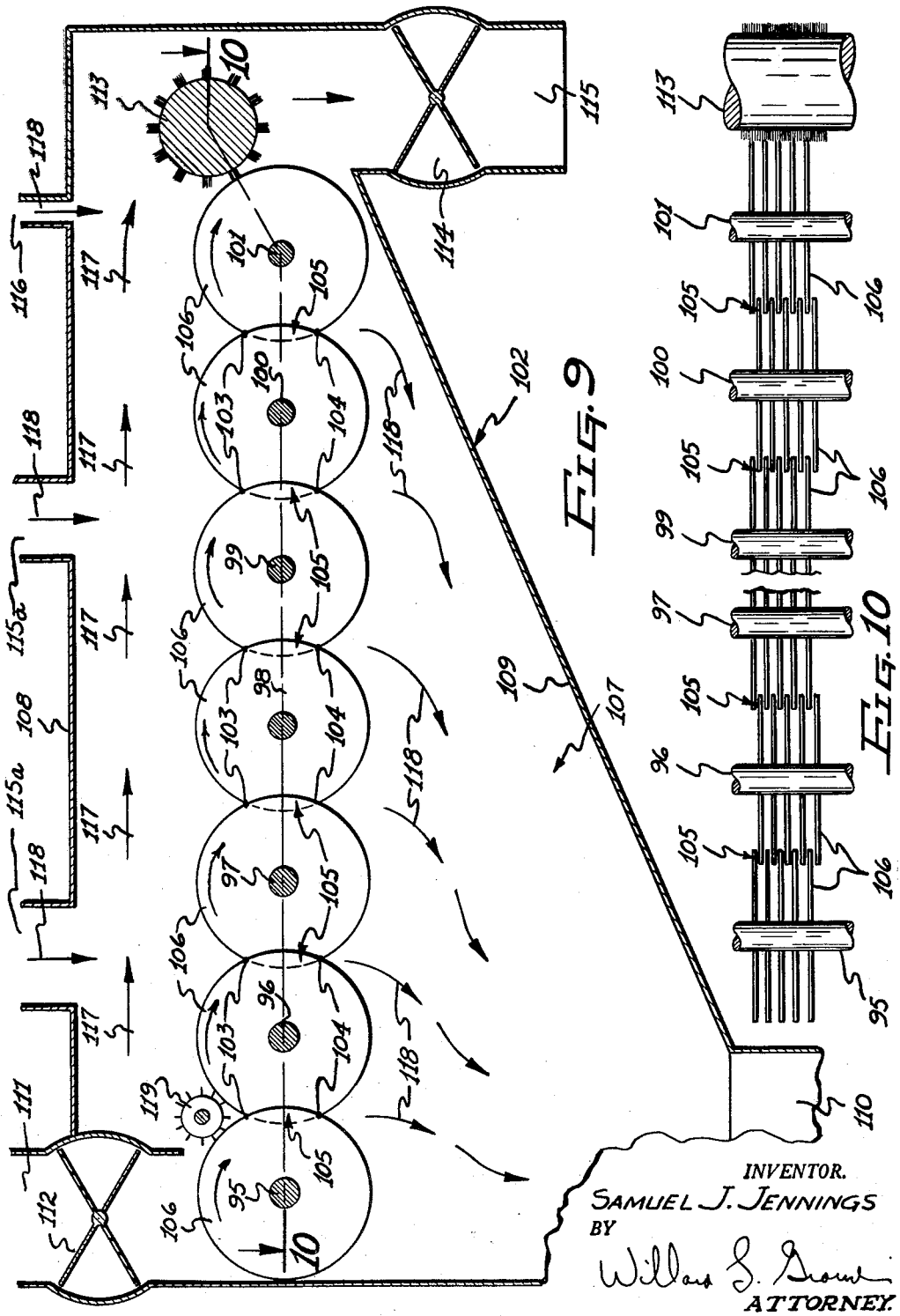

United States Patent Office 3,136,003
Patented June 9, 1964

3,136,003
COTTON CLEANING AND EXTRACTING
APPARATUS
Samuel J. Jennings, Phoenix, Ariz., assignor to Community Gin Company, Glendale, Ariz., a corporation of Arizona
Filed Mar. 23, 1961, Ser. No. 97,949
1 Claim. (Cl. 19—55)

This invention pertains to cotton cleaning and extracting apparatus and is particularly directed to devices for separating the trash, hulls, sticks and other foreign matter from the seed cotton as received from the cotton field after the picking operation.

One of the objects of this invention is to provide cotton cleaning and extracting apparatus of more durable and dependable character and which will outlast former devices heretofore used for such purposes.

Another object of this invention is to provide cotton cleaning and extracting apparatus which is much easier to accurately adjust and put in proper operation.

Another object is to provide a cotton cleaner and extractor capable of much faster extraction of the cotton from the trash and foreign matter that has been heretofore obtained.

A further object is to provide a cotton cleaner and extractor incorporating a plurality of overlapping rotary rib feed discs, axially interspaced to which the cotton to be cleaned is subjected to effect a highly efficient separation of the seed cotton from the trash.

It is also an object to provide a screenless cotton cleaner for seed cotton and other related products in which the seed cotton is turned over-and-over as it travels over a plurality of series of overlapping inter-meshing discs so that all sides of the cotton is cleaned.

Another object is to provide a seed cotton cleaner and extractor having a plurality of series of inter-positioned overlapping discs engaging the cotton mass so as to comb free all grass, motes and other trash during the travel of the cotton through the machine.

A further object is to provide a seed cotton cleaning machine which does not cause excessive working or machining of the cotton fibres during the cleaning operation.

Another object is to provide a seed cotton cleaner which is adapted to be operated in any position, including an upside down position.

A further object is to provide a cotton cleaner and extractor having a plurality of series of peripherally overlapping disc cylinders wherein the axis spacing of the discs is such that suction through the discs will be limited to the trash materials combed from the seed cotton by the disc peripheries and will not pull the cotton through the extractor trash.

And another object is to provide a cotton cleaner and extractor as aforementioned which is capable of removing stems, leaves and grass while at the same time preventing the loss of any cotton fibres with the trash disposed of.

The devices aforementioned are adapted to operate by gravity or with suction and heated air blast as required.

Further features and advantages of this invention will appear from a detailed description of the drawings in which:

FIG. 1 is a diagrammatic cross section of a cotton gin incorporating the features of this invention.

FIG. 2 is an enlarged fragmentary view on the line 2—2 of FIG. 1.

FIG. 3 is a diagrammatic cross section of a cotton hull extractor incorporating the features of this invention.

FIG. 6 is an enlarged fragmentary view on the line 6—6 of FIG. 5.

FIG. 7 is a diagrammatic cross section of a vacuum disc type cotton cleaner incorporating the features of this invention.

FIG. 8 is an enlarged fragmentary view on the line 8—8 of FIG. 7.

FIG. 9 is a diagrammatic cross section of a cleaner for cotton seed and other products of like character.

FIG. 10 is an enlarged fragmentary view on the line 10—10 of FIG. 9.

Figure 4:
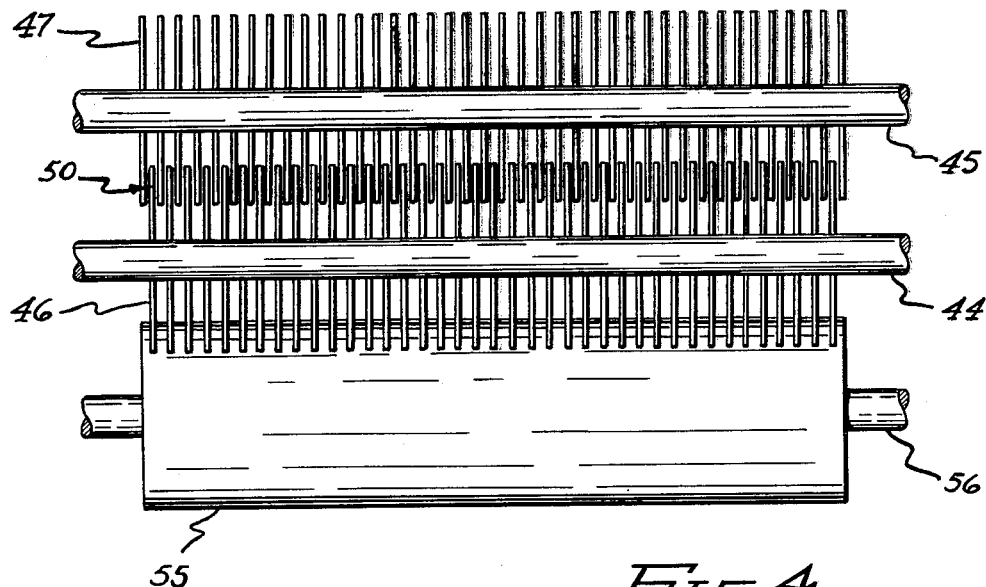
FIG. 4 is an enlarged fragmentary view on the line 4—4 of FIG. 3.

As an example of one embodiment of this invention there is shown, in FIGS. 1 and 2, a cotton gin having a frame 15 including a seed cotton hopper 16. The seed cotton from the hopper 16 enters the substantially cylindrical feed chamber 17 in which is centrally mounted the tubular housing member 18 fixed to the frame 15. A discharge inlet opening 19, the size of which may be regulated by a suitable rocking gate 20 allows the extracted cotton seeds to escape from the cotton being ginned to the screw conveyor 21 for removal from the machine.

Journaled on the frame 15 is the saw shaft 22 and the disc shaft 23 both of which are suitably driven in the same direction, clockwise in FIG. 1, at substantially the same speed. Fixed to the saw shaft 22 are a series of axially spaced saws 24, preferably having a spacing of $3/16"$ between the side faces of each saw. On the disc shaft 23 is fixed a series of axially spaced feed discs 25 having a spacing between the sides of the discs 25 equal to the side spacing between the saws 24. It is important to note that the periphery 26 of the saws 24 and the periphery 27 of the feed discs 25 radially overlap between the points 28 and 29 to form an area of overlap 30.

The overlapping saw 24 and rotary rib feed 25 arrangement recited is positioned in the exposure gap defined by the points 31 and 32, FIG. 1. The cotton entering the hopper 16, FIG. 1, contacts the saw cylinder at and below the point 31. To the rear of the saw discs 24 is located the air blast nozzle 33 connected to the air blast supply pipe 34 through the manifold 35. A lint suction pipe 36 has its suction inlet 37 adjacent the saws 24 and is suitably connected at its other end to the usual lint flue. Suitable gin ribs 38 and a mote board 39 are associated with the saws 24 to control the discharge of trash from the cotton being ginned. In this arrangement, the roll of seed cotton revolves in the cylindrical feed chamber 17 around the tubular member 18 with the periphery of the roll of seed cotton revolving against the saws 24 and the discs 25. The lint cotton is pulled through the revolving discs 25 to provide a highly efficient and fast extraction of the cotton from the seed. The saws in this construction can be put closer together than in cotton gins heretofore utilized.

In FIGS. 3 and 4 is shown a cotton hull extractor comprising a frame 15, FIG. 3, having a seed cotton hopper 41 in which are provided the usual doffer rolls 42 below which is located the kicker roll 43. Suitably journaled on the frame 15 is the saw shaft 44 and the disc shaft 45 suitably driven in the same direction, clockwise in FIG. 3, and at substantially the same speed. Fixed on the shaft 44 are a series of axially spaced saws 46 having approximately $7/16"$ spacing and on the disc shaft 45 is fixed a series of axially spaced discs 47 having a mating spacing of $7/16"$.

It is to be noted that the saws 46 peripherally overlap between the points 48 and 49 with the discs 47 to form the overlapping area 50. A rotary doffer 51 is suitably journaled on the frame 15 and is revolved adjacent the saws 46 and discs 47 at relatively high speed to doff the extracted cotton from the saws and disc and discharge it out through the chute 52. The kicker roll 43 revolves, counterclockwise in FIG. 3, to flick the raw cotton over the screen 53 and up against the saws 46 and discs 47. In this arrangement the cotton is pulled through the revolving discs 47 to provide a clean and decisive extraction of the foreign matter from the seed cotton. The extracted matter drops through the passageway 54 on to a reclaimer saw cylinder 55 carried on the reclaimer saw shaft 56, revolving counterclockwise in FIG. 3, the trash finally discharging out through the chute 57.

Figure 5:
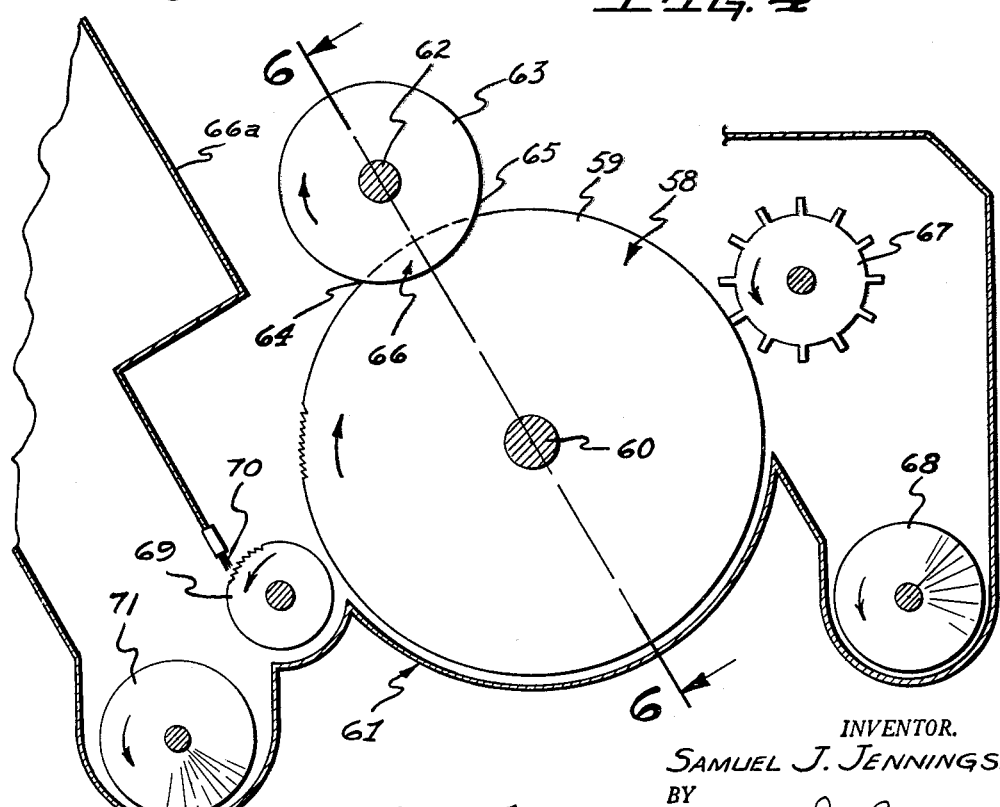
FIG. 5 is a diagrammatic cross section of a bur extractor for use in cotton gin stands.

In FIGS. 5 and 6 is shown a bur extractor for a gin stand utilizing rotary huller ribs. In this arrangement there is a regular gin saw cylinder 58 having a series of axially spaced saws 59 fixed on the saw shaft 60 suitably journaled on the frame 61 of the gin. A disc shaft 62 suitably journaled in the frame 61 has a plurality of axially spaced discs 63 fixed thereon and extending down between the saws 59 and radially overlapping said saws between the points 64 and 65 to form the overlapping area 66.

The seed cotton flows down the seed slide 66a against the periphery of the saw cylinder and the discs 63, the saws pulling the seed cotton through the appropriately spaced discs to effect a separation of the seed cotton from the burs, hulls, and other trash. The brush roll 67 removes the seed cotton from the saws which drop to a suitable screw conveyor 68 for further processing. The extracted trash drops to the reclaimer saw 69 and passes the steel wire brush 70 and then discharges to the dirt and trash conveyor 71 for removal from the machine. In this arrangement there is provided the series of revolving discs 63 through which the saws 59 pull the seed cotton, the axial spacing between the discs being wide enough to allow the locks of cotton to be pulled through while at the same time rejecting and kicking back sticks, hull, burs, and other trash.

In FIGS. 8 and 9 is shown a vacuum disc type cotton cleaner comprising a frame 71a in which are journaled a series of disc shafts 72, 73, 74, 75, 76 and 77, all driven by suitable means to revolve in the same direction, clockwise as shown in FIG. 7. Each shaft 72-77 has fixed thereon a series of axially spaced discs 78, the discs of each shaft being of such size that their peripheries overlap radially with the discs of the other shafts between the points 79 and 80, forming areas of radial overlap at 81.

In this arrangement, the aforementioned series of overlapping disc cylinders are positioned with a vacuum chamber 82 formed by the top 83 and the sloping hopper bottoms 84 and 85. Vacuum air suction is provided at 86. Raw seed cotton to be cleaned is fed into the apparatus at 87 whereupon it engages the first set of discs 78 on the disc shaft 72. Since all the shafts 72-77 revolve in the same direction, the respective discs transport the cotton from disc cylinder to disc cylinder, to the right in FIG. 7, as indicated by the arrows 88, agitating and tumbling the cotton to efficiently dislodge and remove the trash and foreign matter therefrom without damaging or machining the cotton fibres. This operation is aided by the vacuum suction air flowing in the direction indicated by the arrows of air flow 89 out through the suction outlet 86 which holds the cotton against the discs 78 while drawing the trash dislodged from the cotton down through the discs and out through the outlet 86, the heavier materials being deposited in the low portion 90 for removal out through the dump outlet 91. A revolving brush 92 removes the cotton from the final discs on position 93 and discharges it out through the discharge conduit 94. Thus, in this organization, the discs feed and tumble the cotton progressively along a series of radially overlapping discs while suction air through the discs aids in pulling all trash of any nature from the cotton in a highly efficient manner.

The arrangement shown in FIGS. 9 and 10 comprises a series of disc cylinder shafts 95, 96, 97, 98, 99, 100 and 101 journaled in the frame 102 of the cotton cleaner. Each of the shafts 95-101 are driven in the same direction, clockwise as shown in FIG. 9, and preferably with each shaft revolving at an increasingly faster speed, progressing from left to right in FIG. 9. Fixed to each of the shafts 95-101 are a series of axially spaced discs 106 of such diameter as to radially overlap with mating discs on succeeding shafts at the points 103 and 104 so as to form areas of radial overlap 105. The disc cylinders are contained in an air cabinet 107 having a top 108 and a sloping trash slide bottom 109, the latter terminating at its lower end in the suction trash discharge outlet 110.

Raw seed cotton to be cleaned is fed to the unit through the supply inlet 111 and then through the usual vacuum dropper valve 112 whereupon it engages the first of the series of discs 106 on the shaft 95. The cotton is then moved progressively to the right in FIG. 9, over the series of overlapping disc cylinders finally emerging at the high side of the series where a suitable brush cylinder 113 discharges the cleaned seed cotton from the last disc cylinder and discharges it down through a suitable vacuum dropper valve 114 to the seed cotton discharge outlet 115. Preferably, hot dry air is sucked into the air cabinet 107 through the inlet pipes 15a and steam or moisture may be fed into the cabinet through the pipe 116 as the cotton is being tumbled and fed across the series of disc cylinders in the direction indicated by the arrows 117 at substantially right angles to the air flow indicated by the arrows 118.

In this arrangement the cotton to be treated is turned over and over as it travels from disc cylinder to disc cylinder so that all sides are thoroughly cleaned. By constructing every other disc of larger diameter cotton can be freed of grass and motes by the tumbling action caused by the difference in peripheral speeds from one set of discs to the other. Any number of disc cylinders can be utilized without causing harmful machining of the cotton. Any shaped edge may be formed on the edge of the discs to aid in carrying the cotton through the cleaner. Spiked kickers 119 may be placed between each roll to aid in carrying the cotton when little or no suction is used.

The axial spacing of the discs is such that the suction will not pull cotton through the trash, approximately $3/16''$ for average distance. This cleaner will remove stems, leaves and grass for there is ample room between the disc for foreign matter to pass through without losing any appreciable locks of cotton. This device will operate without the top 108 and vacuum droppers 112 and 114 and the first disc cylinder on shaft 95 can be constructed to pick up cotton by having it slide down against this roll from a suitable hopper. The vacuum system permits operation of the device in any position.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claim are intended to be included herein.

Having thus fully set forth and described this invention what is claimed and desired to be obtained by United States Letters Patent is:

A cotton processing machine comprising in combination:

(A) a frame, (B) a horizontally disposed cylindrical feed chamber roll box on said frame having a concave closed cylindrical shell bottom to rotatably upwardly support a roll of seed cotton in said roll box, (C) a seed cotton hopper on said frame located above and adapted to drop seed cotton into the top of said feed chamber roll box, (D) a horizontally disposed discharge screw conveyor housing on said frame located centrally coaxially of said feed chamber above the bottom of said roll box, (E) rotary gin saws horizontally journaled on said frame so as to project into said roll box and located above and to one side of the axis of said feed chamber roll box and conveyor housing, (F) rotary rib feed discs horizontally journaled on said frame so as to project into one side of said feed chamber roll box and radially overlapping said rotary gin saws and vertically positioned below said gin saws so that rotation of said saws and rotary rib feed discs in the same direction causes a cotton roll in said feed chamber roll box to revolve on the bottom of said roll box around said conveyor housing while moving the ginned seed toward the axis of said roll for removal of said ginned seed through said conveyor housing for removal from the feed chamber roll box of the machine while said cotton roll is supported in the bottom of said feed chamber roll box, (G) a horizontally disposed discharge screw conveyor in said discharge screw conveyor housing, (H) an inlet opening in said conveyor housing facing horizontally toward the point of overlap of said rotary rib feed discs and said gin saws, (I) and means in said discharge conveyor housing adapted to vary the discharge of ginned seed into said conveyor through said inlet opening of said discharge screw conveyor.

References Cited in the file of this patent

UNITED STATES PATENTS

| | | |
|---|---|---|
| 233,847 | Groom | Nov. 2, 1880 |
| 1,031,703 | Fordyce | July 9, 1912 |
| 1,341,168 | Cotton | May 25, 1920 |
| 1,565,626 | Doremus | Dec. 15, 1925 |
| 1,630,152 | Williams et al. | May 24, 1927 |
| 1,669,286 | Cozart | May 8, 1928 |
| 1,767,894 | Petty et al. | June 24, 1930 |
| 1,775,111 | Wallace | Sept. 9, 1930 |
| 2,011,838 | Wilson | Aug. 20, 1935 |
| 2,055,630 | McLean | Sept. 29, 1936 |